US006288319B1

(12) United States Patent
Catona

(10) Patent No.: US 6,288,319 B1
(45) Date of Patent: Sep. 11, 2001

(54) ELECTRONIC GREETING CARD WITH A CUSTOM AUDIO MIX

(76) Inventor: Gary Catona, 915 N. Orlando Ave., Los Angeles, CA (US) 90069

( * ) Notice: Subject to any disclaimer, the term of this patent is extended or adjusted under 35 U.S.C. 154(b) by 0 days.

(21) Appl. No.: 09/452,988

(22) Filed: Dec. 2, 1999

(51) Int. Cl.[7] ............................ G09B 5/00; G09F 27/00; G10H 1/26

(52) U.S. Cl. .......................... 84/609; 40/124.03; 40/455; 434/307 A

(58) Field of Search ............................ 84/600–607, 645, 84/609–614; 40/124.03, 455–457; 434/307 A

(56) References Cited

U.S. PATENT DOCUMENTS

| | | | | |
|---|---|---|---|---|
| 5,444,767 | * | 8/1995 | Goetcheus et al. | 40/455 X |
| 5,734,119 | * | 3/1998 | France et al. | 84/645 X |
| 5,834,670 | * | 11/1998 | Yumura et al. | 84/610 |
| 5,860,065 | * | 1/1999 | Hsu | 40/124.03 X |
| 6,036,498 | * | 3/2000 | Kondo | 434/307 A |
| 6,062,868 | * | 5/2000 | Toriumi | 434/307 A |
| 6,182,126 | * | 1/2001 | Nathan et al. | 434/307 A X |

* cited by examiner

*Primary Examiner*—Stanley J. Witkowski
(74) *Attorney, Agent, or Firm*—Klehr, Harrison; Steven J. Gelman

(57) ABSTRACT

A method for creating an electronic greeting card with a custom audio mix over a computer network includes the steps of selecting a pre-recorded song from a song database; downloading the pre-recorded song from the song database, via a server computer, to a client computer over the computer network; recording a vocal track on the client computer while simultaneously playing back the pre-recorded song on the client computer; mixing the vocal track with the pre-recorded song, thereby creating a custom audio mix; saving the custom audio mix on the server computer; assembling the audio mix into an electronic greeting card format; and delivering the electronic greeting card to a recipient via the computer network.

10 Claims, 6 Drawing Sheets

ELECTRONIC GREETING CARD WITH A CUSTOM AUDIO MIX

FIELD OF THE INVENTION

The present invention relates to electronic greeting cards having sound, and, more particularly, to an electronic greeting card having a custom, karaoke-style audio mix which is deliverable over a computer network.

BACKGROUND OF THE INVENTION

Computer software applications presently exist that permit a user to lay down multiple pre-recorded audio tracks and mix these tracks into a custom recording. An exampie of this type of software is "Internet Audio Mix" by Acoustica, which allows a user to mix multiple pre-recorded audio tracks from a wide variety of formats and sampling rates, record their own audio tracks, and mix their own audio tracks with the pre-recorded tracks. Internet Audio Mix also allows a user to output the mixed audio tracks in WAVE and REALAUDIO formats that can be transmitted over the Internet.

However, Internet Audio Mix has some drawbacks. First, it is a stand-alone application that only runs in a Microsoft WINDOWS operating environment. Second, it has no interface to allow recordings to be retrieved and saved through the World Wide Web. The files that Internet Audio Mix imports and exports are all stored locally on the user's computer.

Electronic greeting cards that are deliverable over the Internet also presently exist, in a variety of formats, including those with animation and pre-recorded audio. These types of cards come from companies such as American Greetings (www.americangreetings.com) and Blue Mountain Arts (www.bluemountainarts.com). However, there is no electronic greeting card that permits a user to add a custom audio track to the card.

SUMMARY OF THE INVENTION

The present invention fills the gap left by the prior art, by allowing a user to create an electronic greeting card with a custom audio track, generally in the form of the sender's voice mixed with a pre-recorded audio track (i.e., a karaoke-style mix). The present invention is designed with a client/server architecture, such as that commonly used for transmitting World Wide Web pages over the Internet. The pre-recorded audio tracks are stored on the server side and are delivered to the client side upon request. The user records the custom audio track on the client side. The mixing of the custom audio track with the pre-recorded audio track can occur on either the client side or the server side. If the mixing is performed on the client side, the user will have greater control over the mixing parameters, and will be able to more easily fine-tune the mix to their liking. In order to ensure the widest compatibility across a variety of computing platforms, both the client-side components and the server-side components are preferably written in a language such as the JAVA programming language.

A method for creating an electronic greeting card with a custom audio mix over a computer network according to the present invention includes the steps of selecting a pre-recorded song from a song database; downloading the pre-recorded song from to song database, via a server computer, to a client computer over the computer network; recording a vocal track on the client computer while simultaneously playing back the pre-recorded song on the client computer; mixing the vocal track with the pre-recorded song, thereby creating a custom audio mix; saving the custom audio mix on the server computer; assembling the audio mix into an electronic greeting card format; and delivering the electronic greeting card to a recipient via the computer network.

Because the present invention uses a karaoke-style implementation to create the electronic greeting card, the same process can be used to create a computer network-based karaoke system. In such circumstances, the process can be stopped after the pre-recorded song and the vocal track are mixed. A method for creating a karaoke mix over a computer network includes the steps of selecting a pre-recorded song from a song database; downloading the pre-recorded song from the song database, via a server computer, to a client computer over the computer network; recording a vocal track on the client computer while simultaneously playing back the pre-recorded song on the client computer; mixing the vocal track with the pre-recorded song, thereby creating a karaoke mix; and playing back the karaoke mix.

BRIEF DESCRIPTION OF THE DRAWINGS

For a better understanding of the present invention, reference is made to the following detailed description of two exemplary embodiments considered in conjunction with the accompanying drawings, in which.

DETAILED DESCRIPTION OF THE INVENTION

Figure 1:
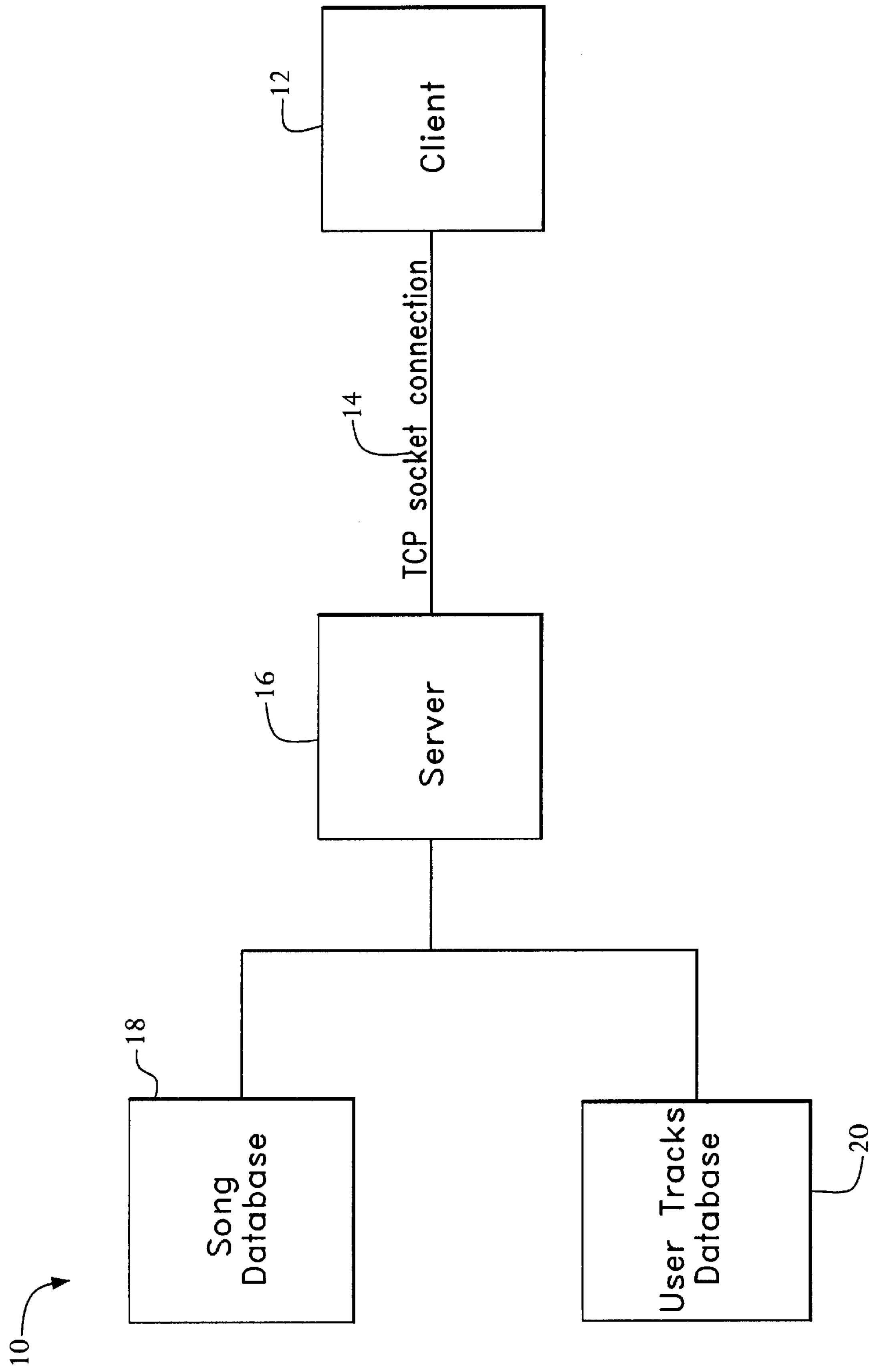
FIG. 1 is a schematic overview of a first embodiment of the present invention, showing a client-side mix.

As shown in FIG. 1, a greeting card system 10 includes a client computer 12 connected via a TCP socket connection 14 to a server computer 16. A song database 18 containing a plurality of pre-recorded audio tracks is connected to the server 16. A user tracks database 20 which stores the custom-mixed audio tracks created by a user is also connected to the server 16.

Figure 2:
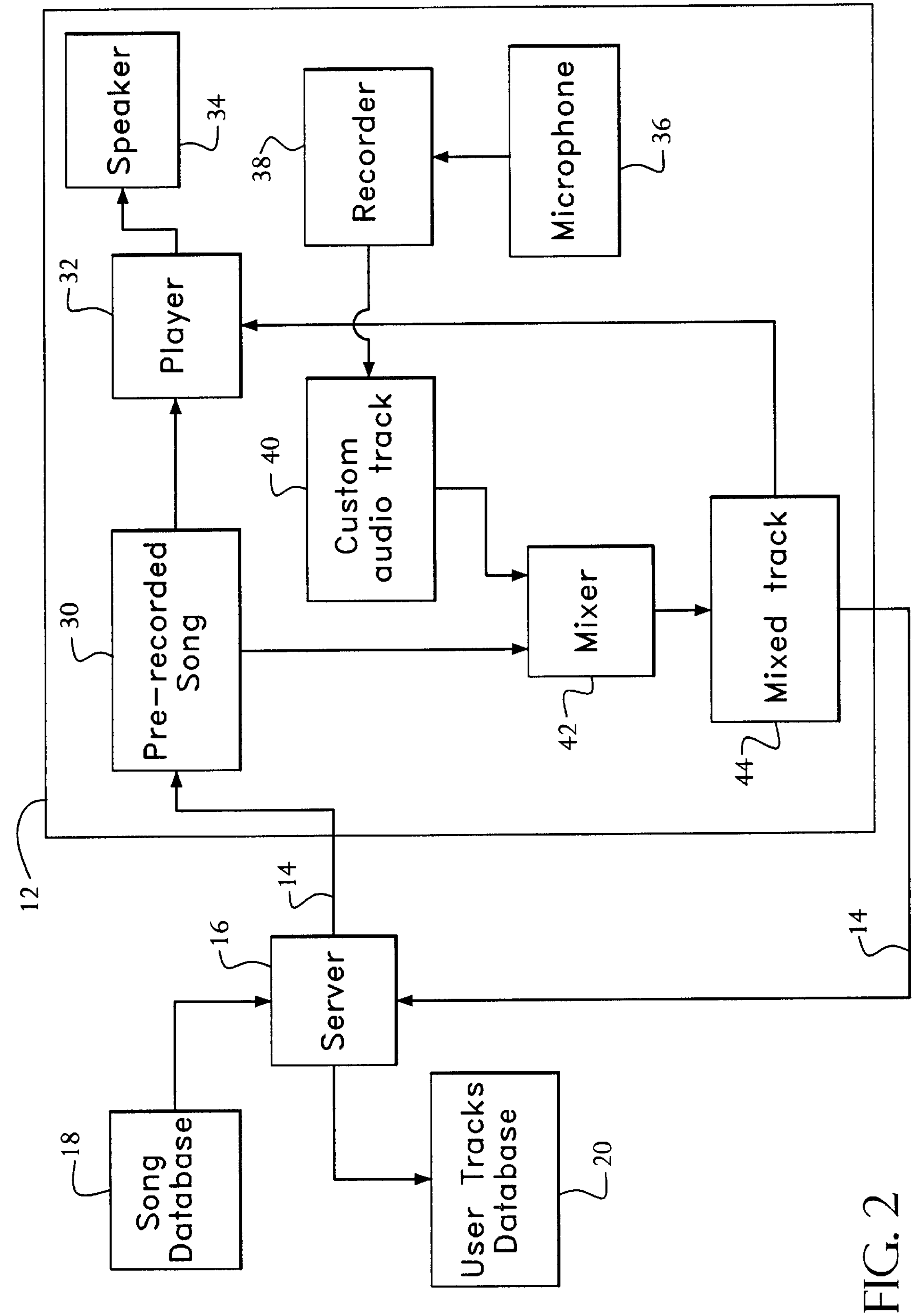
FIG. 2 is a detail schematic of the client-side shown in FIG. 1, including data flow.

FIG. 2 shows a detail schematic of the client 12, with the arrows on the connecting lines indicating the direction of data flow. When the user selects a pre-recorded song 30 from the song database 18, the song 30 is transferred to the client 12 via the server 16. In order to deter illegal copying, the pre-recorded songs 30 may be stored on the song database 18 and transmitted to the client 12 in an encrypted format. To properly mix the custom audio track with the pre-recorded track, a karaoke-style implementation is used, wherein the song is played while the user sings the vocal track. To perform this implementation, the pre-recorded song 30 is sent to an audio player 32, which outputs the song 30 through a speaker 34. While the song 30 is being played, the user sings into a microphone 36 that is connected to a recorder 38, for recording the custom audio track 40 (i.e., the vocal portion of a song).

A mixer 42 combines the pre-recorded song 30 and the custom audio track 40 into a mixed track 44. The mixed track 44 can be played back to the user via the audio player 32 and the speaker 34. If the mixed track 44 is not acceptable to the user, it can be remixed and replayed until acceptable. Once the mixed track 44 is satisfactory to the user, it is transmitted to the server 16, where it is stored in the user tracks database 20.

The functionality on the client side 12 is preferably implemented in a platform-independent programming language, such as JAVA. This program can be either a stand-alone application or an applet embedded in a World Wide Web page. The client application permits a user to browse for a desired pre-recorded song 30, select the desired pre-recorded song; 30, and download the desired pre-recorded song 30 from the song database 18 to the client 12. In this embodiment of the greeting card system 10, the client application also controls and performs the mixing of the pre-recorded song 30 and the custom audio track 40. The server-side implementation utilizes standard programming language technologies, including JAVA, JAVASCRIPT, COLD) FUSION, ASP, and SQL Server.

Figure 3:
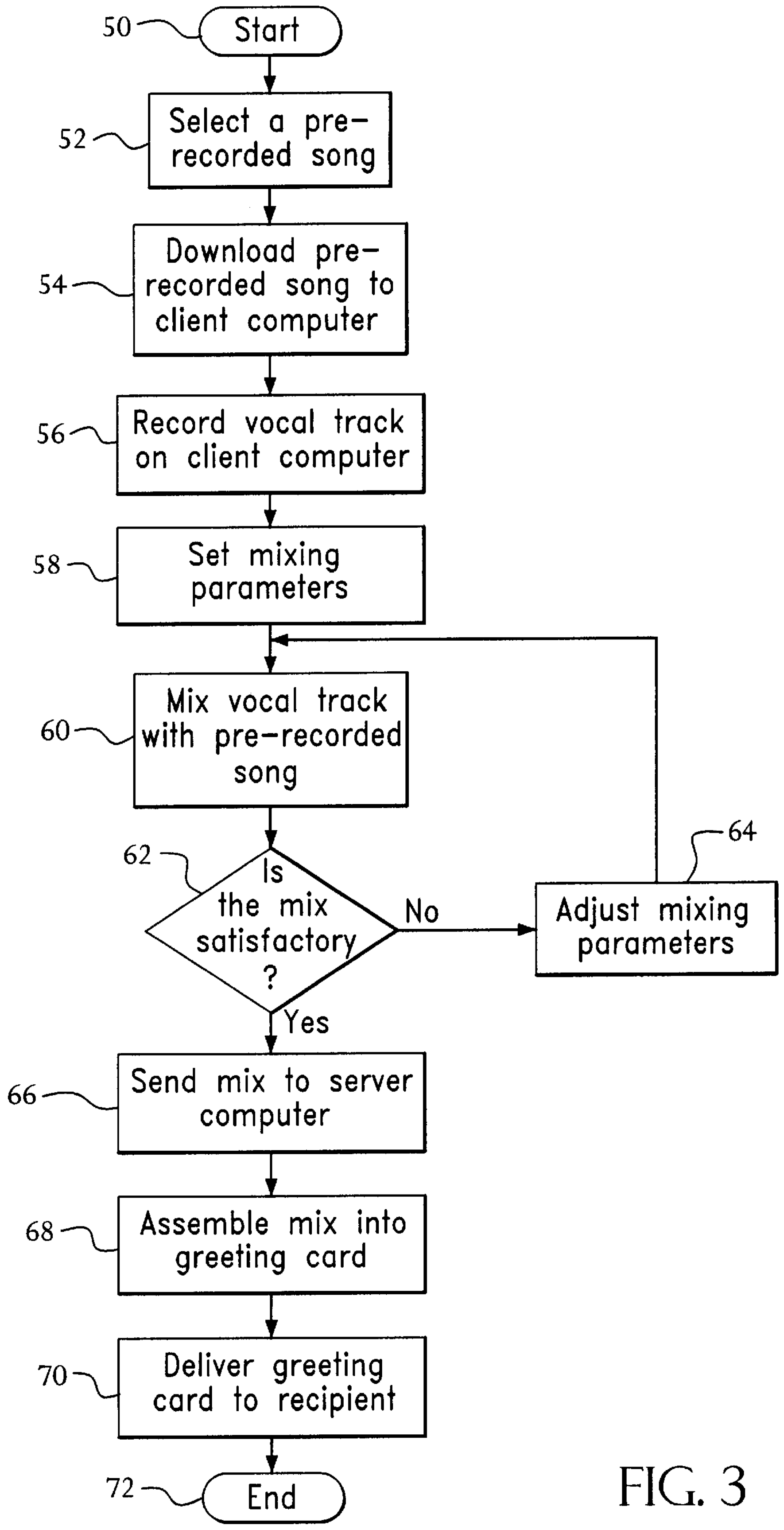
FIG. 3 is a flow diagram of the method performed by the client-side mix shown in FIG. 1.

Referring now to FIG. 3, the process for creating a client-side mixed greeting card begins at step 50. The user selects a pre-recorded song 30 from the song database 18 at step 52. This step can include permitting the user to search for a specific song or browse through the song database 18. The selected pre-recorded song 30 is then downloaded to the client computer 12 at step 54. In step 56, the user records the vocal track 40 to accompany the song 30 on the client computer 12. The user selects the mixing parameters in step 58, and the pre-recorded song 30 and the vocal track 40 are mixed in step 60. A determination 62 is made as to whether the user finds the mixed track 44 satisfactory. If the user does not like the mixed track 44, control is passed to step 64, where the user adjusts the mixing parameters, and the tracks are re-mixed at step 60.

If the mixed track 44 is satisfactory to the user, the mixed track 44 is sent to the server computer 16 in step 66, where the mixed track 44 is assembled into a greeting card at step 68. The assembled greeting card is delivered to the intended recipient in step 70, and the process terminates at step 72.

The amount of processing involved at step 68 will depend upon the format of the greeting card. For example, the greeting card may be formatted as an electronic mail attachment and sent directly to the recipient or the card may be stored on the server 16 for manual retrieval by the recipient. In the latter case, an electronic mail message would be sent to the recipient containing a Uniform Resource Locator (URL) which provides a hyperlink to the server 16 and the specific card intended for the recipient, thereby permitting the recipient to directly access his or her card.

The benefits of this embodiment are that the user has control over the mixing parameters and since the bulk of the data processing is performed on the client 12, there is a minimal amount of data transfer between the client 12 and the server 16.

Figure 4:
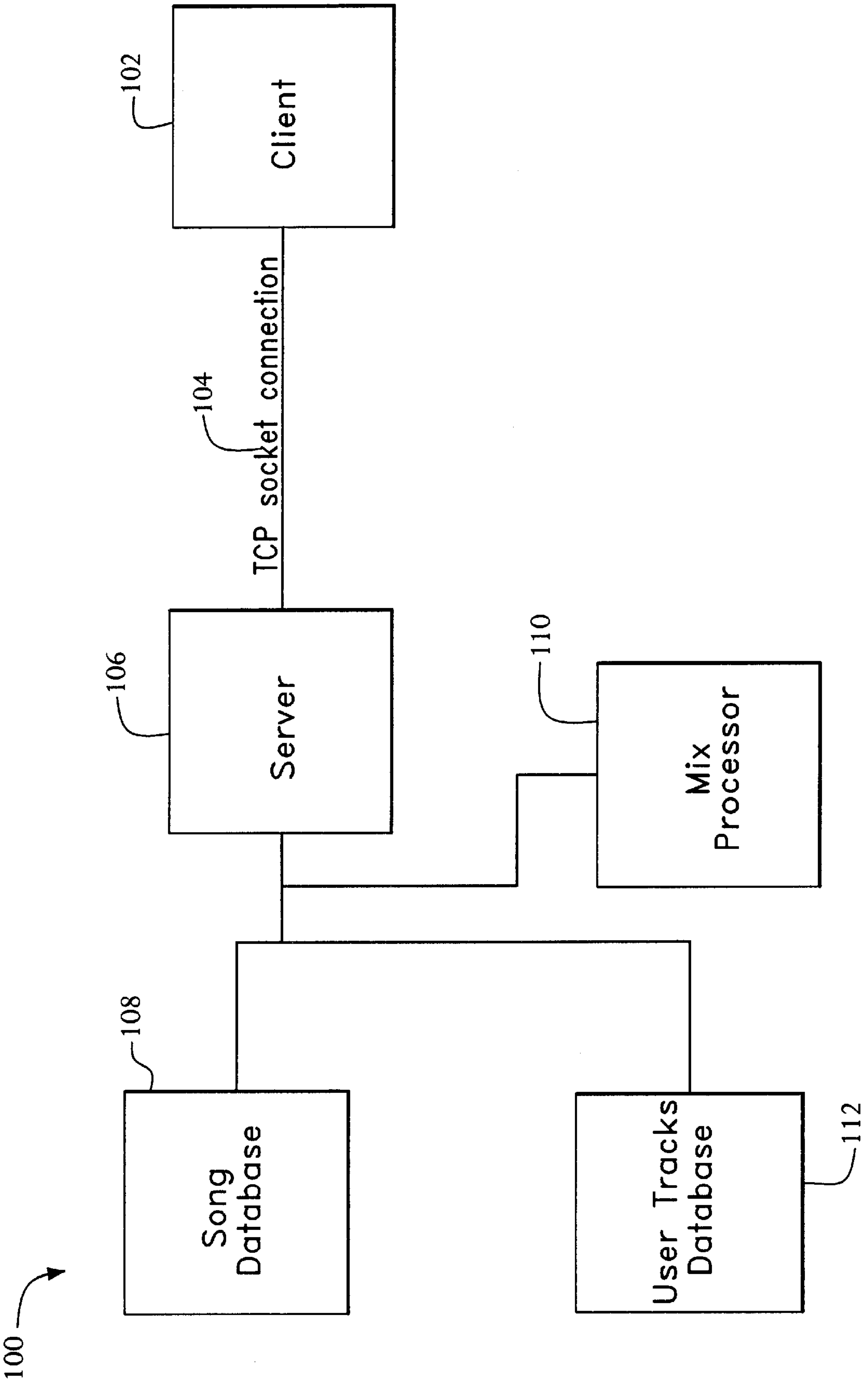
FIG. 4 is a schematic overview of an alternate embodiment of the present invention, showing a server-side mix.
Figure 5:
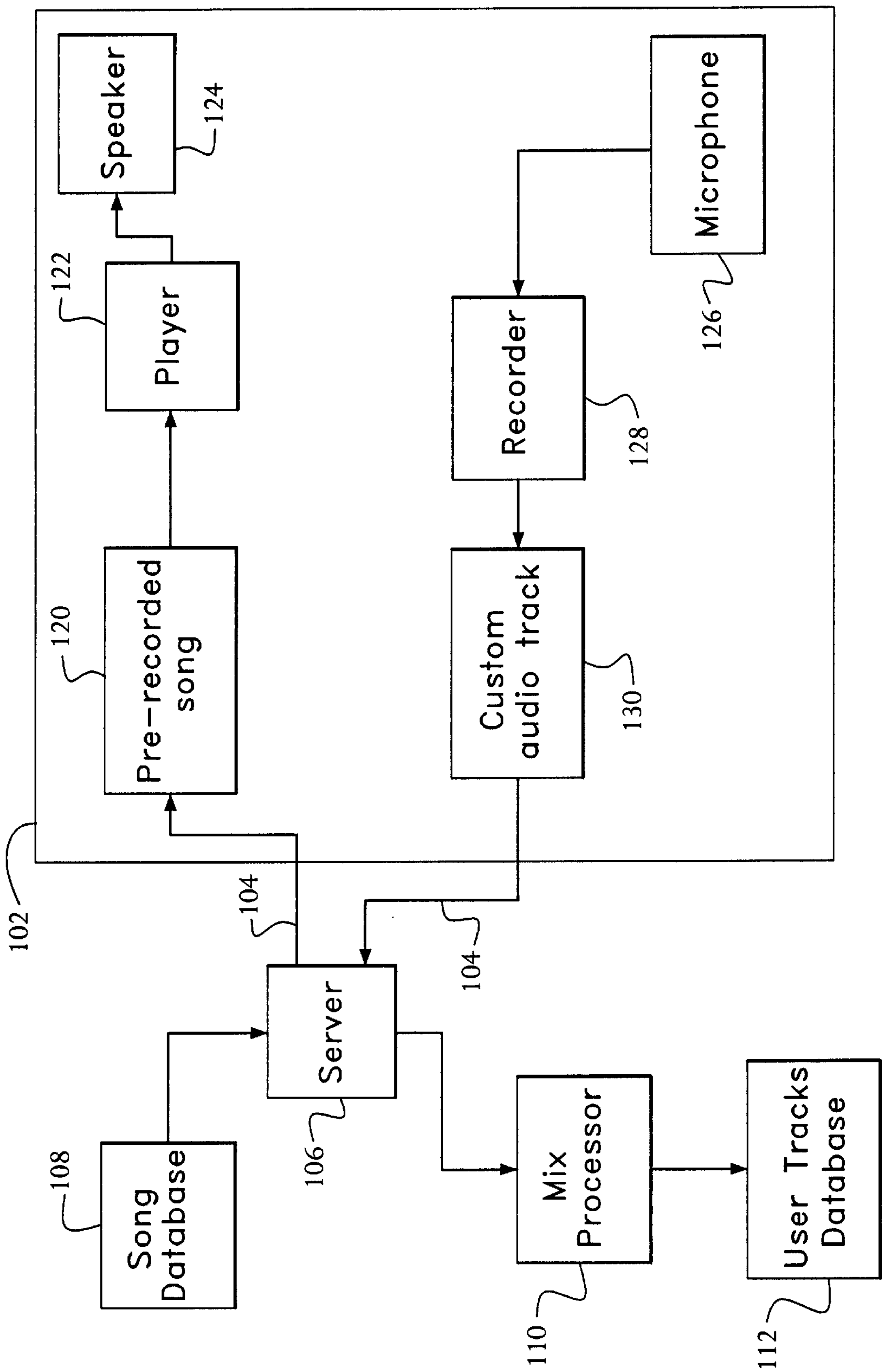
FIG. 5 is a detail schematic of the client-side shown in FIG. 4, including data flow.
Figure 6:
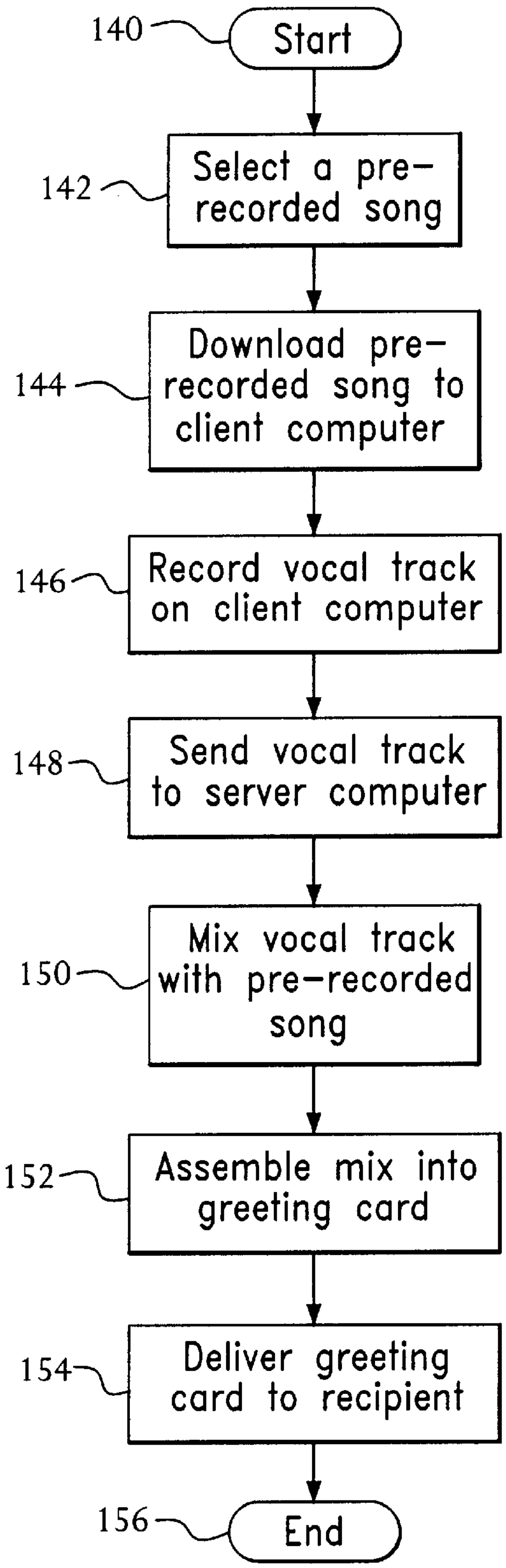
FIG. 6 is a flow diagram of the method performed by the server-side mix shown in FIG. 4.

FIGS. 4–6 illustrate an alternate embodiment of the present invention, where the mixing occurs on the server side. As shown in FIG. 4, a greeting card system 100 includes a client computer 102 which is connected via a TCP socket connection 104 to a server computer 106. A song database 108 containing a plurality of pre-recorded audio tracks is connected to the server 106. A mix processor 110 is connected to the system 100 and combines a custom audio track recorded on the client computer 102, which is transmitted to the mix processor 110 via the server 106, with a song from the song database 108. The mix processor 110 stores the mixed audio tracks on a user tracks database 112.

FIG. 5 shows a detail schematic of the client 102, with the arrows on the connecting lines indicating the direction of data flow. When the user selects a pre-recorded song 120 from the song database 108, the song 120 is transferred to the client 102 via the server 106. In order to deter illegal copying, the pre-recorded songs 120 may be stored on the song database 108 and transmitted to the client 102 in an encrypted format. To properly mix the custom audio track with the pre-recorded track, a karaoke-style implementation is used, wherein the song is played while the user sings the vocal track. To perform this implementation, the pre-recorded song 120 is sent to an audio player 122, which outputs the song 120 through a speaker 124. While the song 120 is being played, the user sings into a microphone 126 that is connected to a recorder 128, for recording the custom audio track 130 (i.e., the vocal portion of a song). The custom audio track 130 is then sent to the server 106, where it is passed to the mix processor 110, which combines the custom audio track 130 with the pre-recorded song 120 into a mixed track which is stored in the user tracks database 112.

As shown in FIG. 6, the process for creating a server-side mixed greeting card beings at step 140. The user selects a pre-recorded song 120 from the song database 108 at step 142. This step can include permitting the user to search for a specific song or browse through the song database 108. The selected pre-recorded song 120 is then downloaded to the client computer 102 at step 144. In step 146, the user records the vocal track 130 to accompany the song 120 on the client computer 102, which is sent to the server 106 in step 148. In step 150, the pre-recorded song 120 and the vocal track 130 are mixed by the mix processor 110. The mixed tracks are then assembled into a greeting card at step 152. The assembled greeting card is delivered to the intended recipient in step 154, and the process terminates at step 156.

The amount of processing involved at step 152 will depend upon the format of the greeting card. For example, the greeting card may be formatted as an electronic mail attachment and sent directly to the recipient or the card may be stored on the server 106 for manual retrieval by the recipient. In the latter case, an electronic mail message would be sent to the recipient containing a Uniform Resource Locator (URL) which provides a hyperlink to the server 106 and the specific card intended for the recipient, thereby permitting the recipient to directly access his or her card.

The functionality on the client side 102 is preferably implemented in a platform-independent programing language, such as JAVA. This program can be either a stand-alone application or an applet embedded in a World Wide Web page. The client application permits a user to browse for a desired pre-recorded song 120, select the desired pre-recorded song 120, and download the desired pre-recorded song 120 from the song database 108 to the client 102. The server side implementation utilizes standard programming language technologies, including JAVA, JAVASCRIPT, COLD FUSION, ASP, and SQL Server. The benefit of this embodiment is that all the mixing is done by an automated process on the server 106. This permits more controlled mixing, allowing precise adjustment of the mixing parameters without human intervention.

Based upon the karaoke-style implementation of the vocal track recording, it is also possible to provide a client-side captioning interface that would display the lyrics of the selected pre-recorded song, thereby allowing the user to read the lyrics as they sing along. Another modification would be to permit multiple users to contribute the vocal track for a single pre-recorded song, and having the server mix the multiple vocal tracks for a layered, group-like effect.

Because both embodiments of the present invention use a karaoke-style implementation to create the electronic greeting card, either of these processes can be used to create a computer network-based karaoke system. In such circumstances, the processes can be stopped after the pre-recorded song and the vocal track are mixed (i.e., after steps 64 or 150). In a client-side mixing implementation, a user could adjust the quality of the mix until they obtained a desired result, without having to sing the song multiple times.

It will be understood that the embodiments described herein are merely exemplary and that a person skilled in the art may make many variations and modifications without departing from the spirit and scope of the present invention. All such variations and modifications are intended to be included within the scope of the invention as defined in the appended claims.

What is claimed is:

1. A method for creating an electronic greeting card with a custom audio mix over a computer network, comprising the steps of:

selecting a pre-recorded song from a song database;

downloading the pre-recorded song from the song database, via a server computer, to a client computer over the computer network;

recording a vocal track on the client computer while simultaneously playing back the pre-recorded song on the client computer;

mixing the vocal track with the pre-recorded song, thereby creating a custom audio mix;

saving the custom audio mix on the server computer;

assembling the audio mix into an electronic greeting card format; and delivering the electronic greeting card to a recipient via the computer network.

2. The method of claim 1, wherein the selecting step includes searching the song database for a particular song.

3. The method of claim 1, wherein the selecting step includes browsing the song database.

4. The method of claim 1, wherein the mixing step is performed on the client computer and the custom audio mix is uploaded to the server computer over the computer network.

5. The method of claim 4, wherein a user previews the custom audio mix prior to uploading the custom audio mix to the server computer.

6. The method of claim 5, wherein if the custom audio mix is not satisfactory to the user, then performing the steps of adjusting the mixing parameters and remixing the vocal track with the pre-recorded song, the adjusting and remixing steps being performed prior to uploading the custom audio mix to the server computer.

7. The method of claim 1, wherein after the recording step, the vocal track is uploaded to the server computer over the computer network, and the mixing step is performed on the server computer.

8. The method of claim 1, wherein the delivering step includes sending the electronic greeting card as an electronic mail message attachment.

9. The method of claim 1, wherein the delivering step includes sending an electronic mail message containing a uniform resource locator permitting the recipient to access the server computer and the electronic greeting card.

10. A method for creating an electronic greeting card with a custom audio mix over a computer network, comprising the steps of:

selecting a pre-recorded song from a song database;

downloading the pre-recorded song from the song database, via a server computer, to a client computer over the computer network;

recording a vocal track on the client computer while simultaneously playing back the pre-recorded song on the client computer, thereby creating a custom audio mix;

saving the custom audio mix;

assembling the audio mix into an electronic greeting card format; and delivering the electronic greeting card to a recipient via the computer network.

* * * * *